United States Patent [19]

Frost et al.

[11] 4,101,054

[45] Jul. 18, 1978

[54] PNEUMATIC AUTOMATIC SCREWFEEDER

[76] Inventors: Francis Edmund Frost, 301 Foothill Ave., Sierra Madre, Calif. 91024; Robert Mack, 507 S. Arturo St., West Covina, Calif. 91791

[21] Appl. No.: 728,250

[22] Filed: Sep. 30, 1976

[51] Int. Cl.$^2$ .............................................. B65H 3/08
[52] U.S. Cl. .................................... 221/278; 221/225
[58] Field of Search .............. 221/166, 178, 278, 298, 221/225; 144/32; 194/1 K, 97 B, 101

[56] References Cited

U.S. PATENT DOCUMENTS

| | | | |
|---|---|---|---|
| 2,611,911 | 9/1952 | Graham et al. | 221/298 |
| 2,803,274 | 8/1957 | Zubal et al. | 144/32 |
| 3,021,882 | 2/1962 | Knoll et al. | 144/32 |
| 3,124,269 | 3/1964 | Tobler | 221/298 X |
| 3,339,799 | 9/1967 | Spisak | 221/278 X |
| 3,410,453 | 11/1968 | Lawrence | 221/298 X |
| 3,772,757 | 11/1973 | Goldstein | 144/32 X |
| 3,775,941 | 12/1973 | Bross | 221/298 X |
| 3,902,537 | 9/1975 | Donnelli | 144/32 |
| 3,960,191 | 6/1976 | Murray | 144/32 R |

FOREIGN PATENT DOCUMENTS 931,557   8/1955   Fed. Rep. of Germany ....... 221/298

Primary Examiner—Robert B. Reeves
Assistant Examiner—Fred A. Silverberg
Attorney, Agent, or Firm—Huebner & Worrel

[57] ABSTRACT

An automatic fastener feeder having fastener supply means to a carrying means and means to move the fasteners in the carrying means to a discharge end, first fastener metering means adapted to withhold and alternatively discharge single fasteners from the discharge end of the carrying means, a second fastener metering means adjacent the first metering means adapted to receive a single discharged fastener from the first metering means, and a feed tube connected at one end of the second metering means and connected at its other end to a fastener tool to supply fasteners thereto, the second metering means being adapted to release a single fastener to the feed tube when the first metering means is withholding a single fastener. The second metering means is provided with a hand openable latch plate so that it may easily be cleared of any jamming caused by deformed fasteners or parts thereof.

16 Claims, 9 Drawing Figures

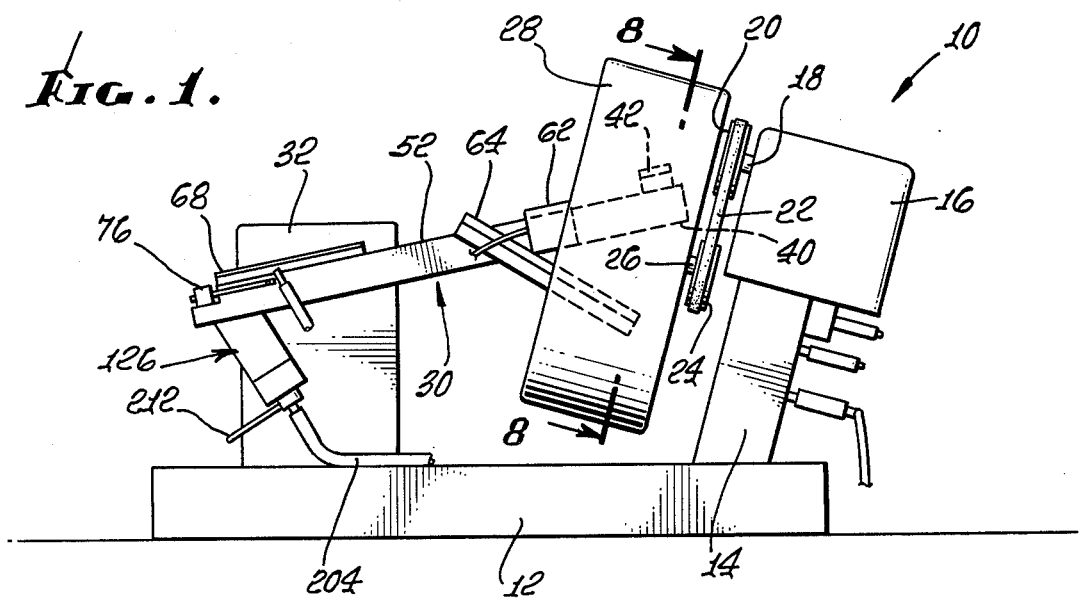
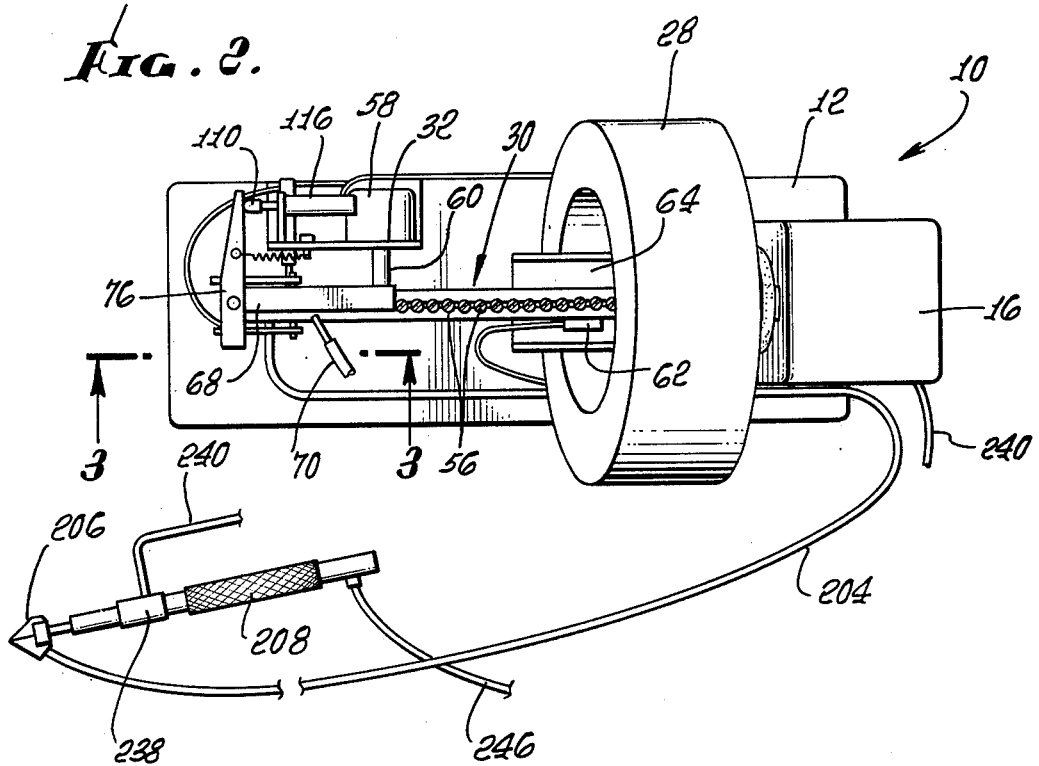

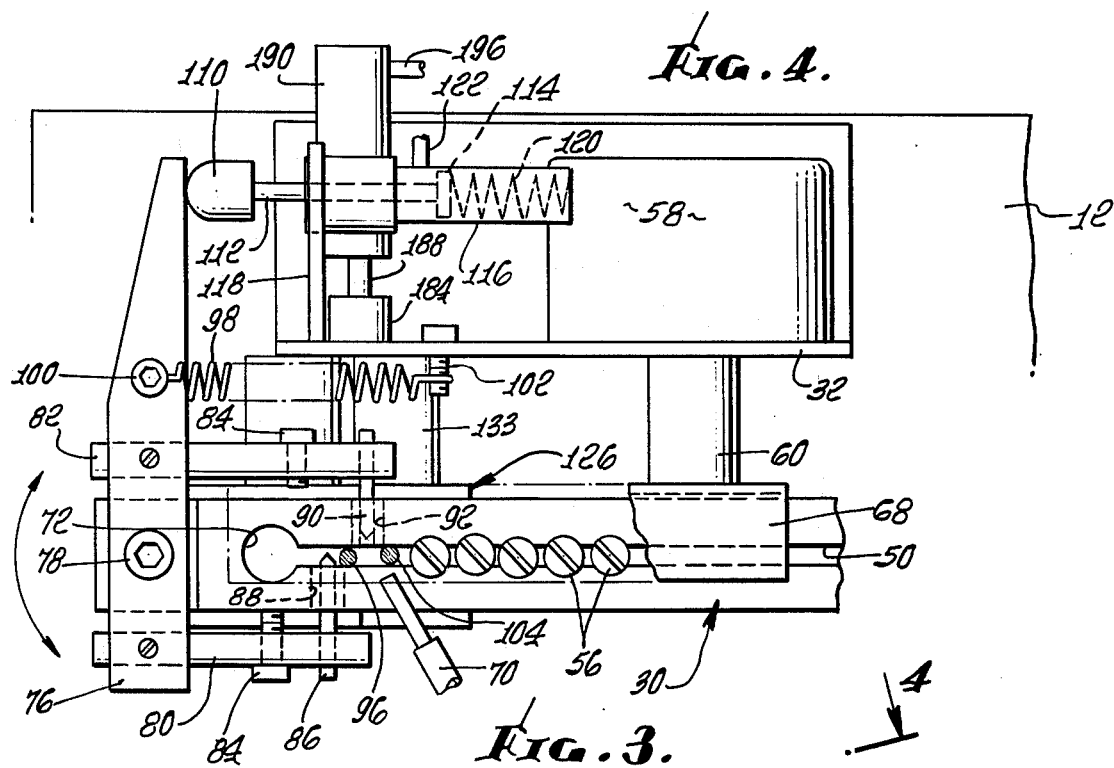
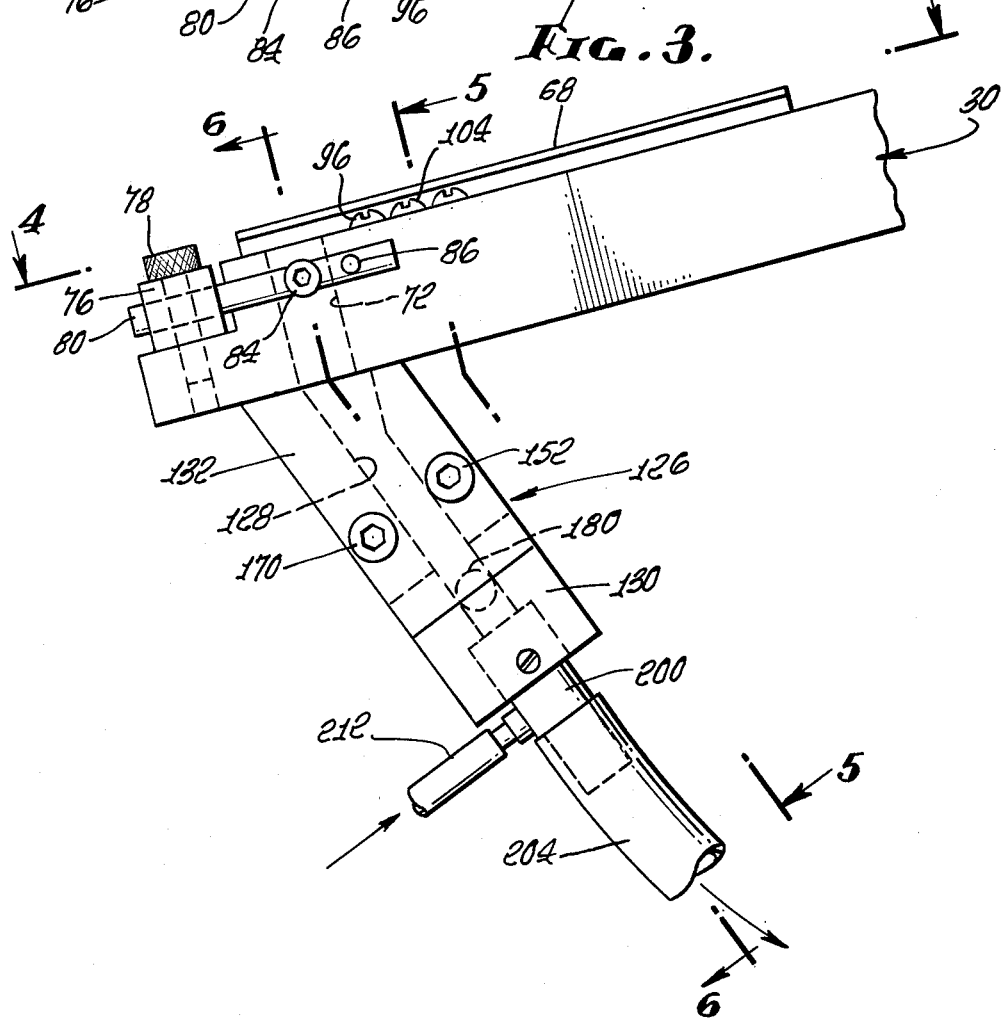

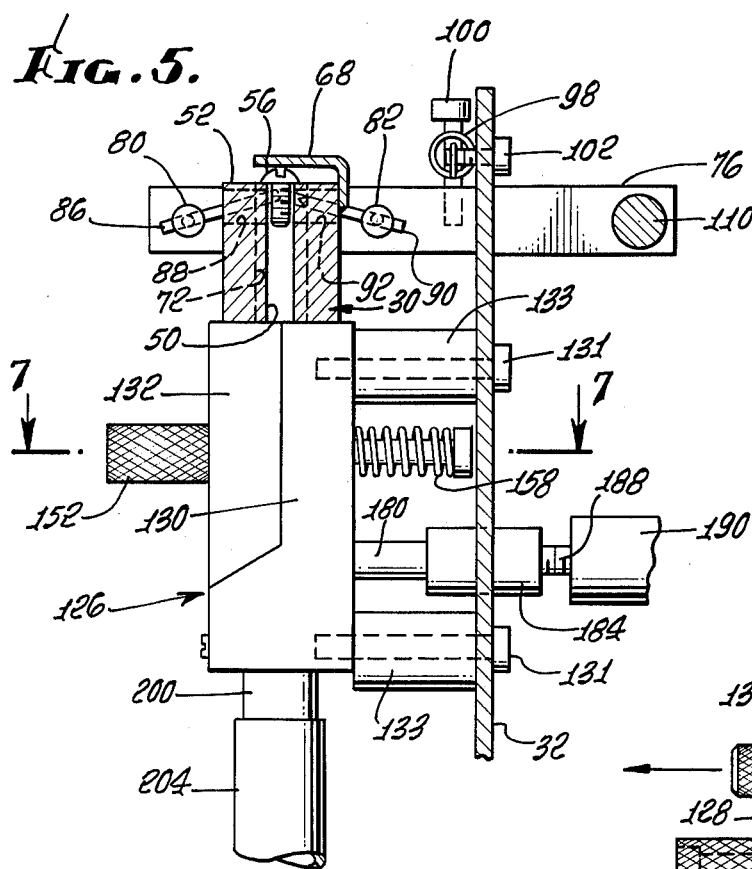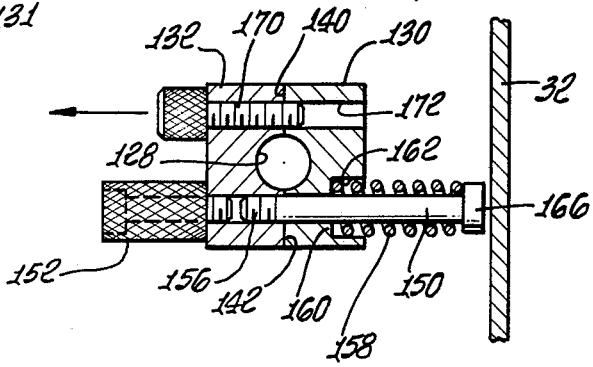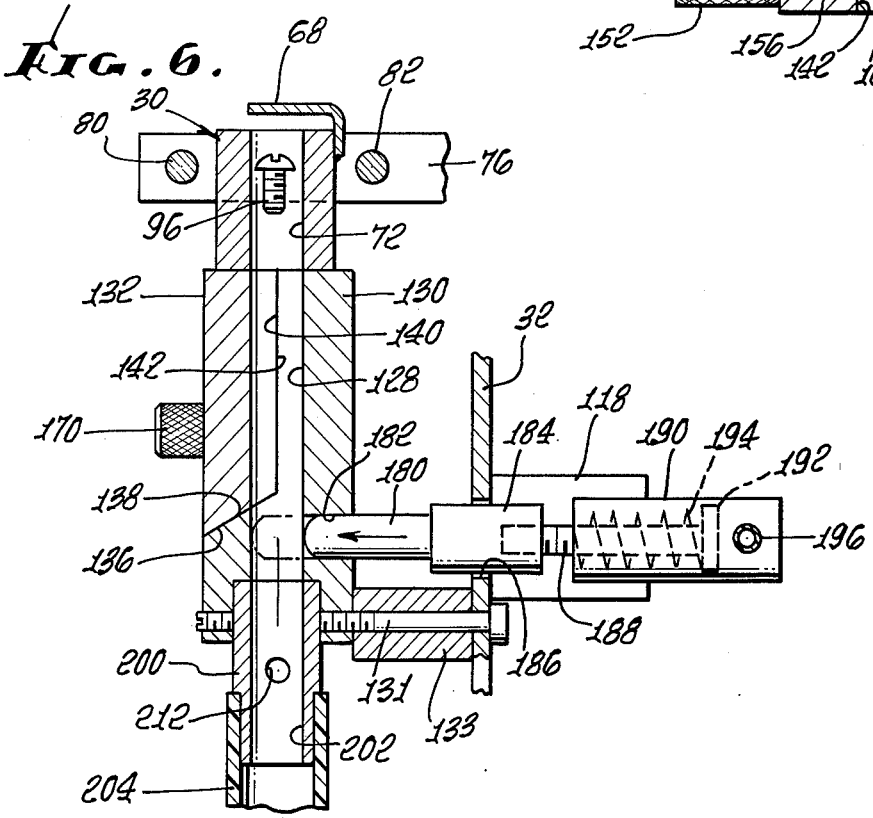

PNEUMATIC AUTOMATIC SCREWFEEDER

BACKGROUND OF THE INVENTION

The invention relates to automatic fastener feeders, particularly pneumatic screwfeeders. In the prior art the automatic fastener feeders or screwfeeders have been prone to jam because commercial fasteners are typically not properly finished for smooth continuous operation. For example, the heads of screws tend to be out of round and the screws frequently have flashing on the heads or bodies that stop the regular flow in the feeder and frequently cause time-consuming jamming. The prior art feeders typically have single metering means which is adapted to feed continuously. Because of the erratic structure of the screws, jamming occurs frequently enough to destroy the efficiency of the machines. In the prior art machines when jamming occurs, unjamming can be accomplished only by removal of screws or bolts to open the device, which removal is very time-consuming.

SUMMARY OF THE INVENTION

Jamming problems which occur in the prior art automatic screwfeeders are substantially removed by the present invention which provides a double metering system which moves the screws sequentially. These movements, because the metering is performed during the screw driving cycle, substantially reduce the total operating time. In the prior art automatic screwfeeders, the metering, the blow-down of the screws to the screwdrivers and the screw driving typically require between 1.8 seconds and 1.9 seconds for the total cycle for a selected common screw, whereas, in the present invention, the total cycle time is 1.5 seconds. Thus, there is a reduction of between 0.3 and 0.4 of a second in each cycle.

The first metering occurs in a ramp track where typically malformed screw heads are avoided in the operation. The metering is performed by an escapement mechanism, functioning with respect to the screw bodies or shanks, which are manufactured under tighter controls than the heads.

Where there is a jamming in the present invention, as may occur in the second metering operation, a spring held latch plate can be easily removed by hand to clear out the deformed fasteners which cause the jamming.

Accordingly, it is an object of the invention to provide an improved pneumatic automatic fastener feeder.

It is another object of the invention to provide a double metering system in an automatic screwfeeder that moves the screws at a continuous rate with a minimum of jamming.

It is still another object of the invention to provide an automatic feeder, as described in the previous paragraphs, in which first metering of the screws is accomplished with respect to the screw shanks or bodies rather than with respect to the commonly found malformed heads.

It is a further object of the invention to provide an automatic feeder, as described in the previous paragraphs, in which the metering is performed during the screw driving cycle so as to substantially reduce the overall operating time for feeding and driving screws.

It is a still further object of the invention to provide an automatic feeder, as described in the previous paragraphs, that avoids misfeeding in the initial supplying, carrying and first metering functions, using commercial grade fasteners.

It is another object of the invention to provide an automatic feeder, as described in the previous paragraphs, which handles commercial grade screws with little difficulty and which provides an easy unjamming device for removing the deformed jammed parts when jamming does occur.

It is still another object of the invention to provide an automatic feeder, as described in the previous paragraphs, which is completely adjustable for use with screws of various sizes without the use of shims or other modifications to the structure.

Further objects and advantages of the invention may be brought out in the following part of the specification wherein small details have been described for the competence of disclosure, without intending to limit the scope of the invention which is set forth in the appended claims.

BRIEF DESCRIPTION OF THE DRAWINGS

Referring to the accompanying drawings, which are for illustrative purposes:

FIG. 1 is a side elevational view of a pneumatic automatic screwfeeder according to the invention;

FIG. 2 is a plan view of the screwfeeder shown in FIG. 1;

FIG. 3 is a fragmentary view taken along the lines 3—3 in FIG. 2;

FIG. 4 is a detailed plan view taken along the lines 4—4 in FIG. 3;

FIG. 5 is a partially cross-sectional view taken along the lines 5—5 in FIG. 3;

FIG. 6 is a cross-sectional view taken along the lines 6—6 in FIG. 3;

FIG. 7 is a cross-sectional plan view taken along the lines 7—7 in FIG. 5;

DESCRIPTION OF THE PREFERRED EMBODIMENTS

Figure 8:
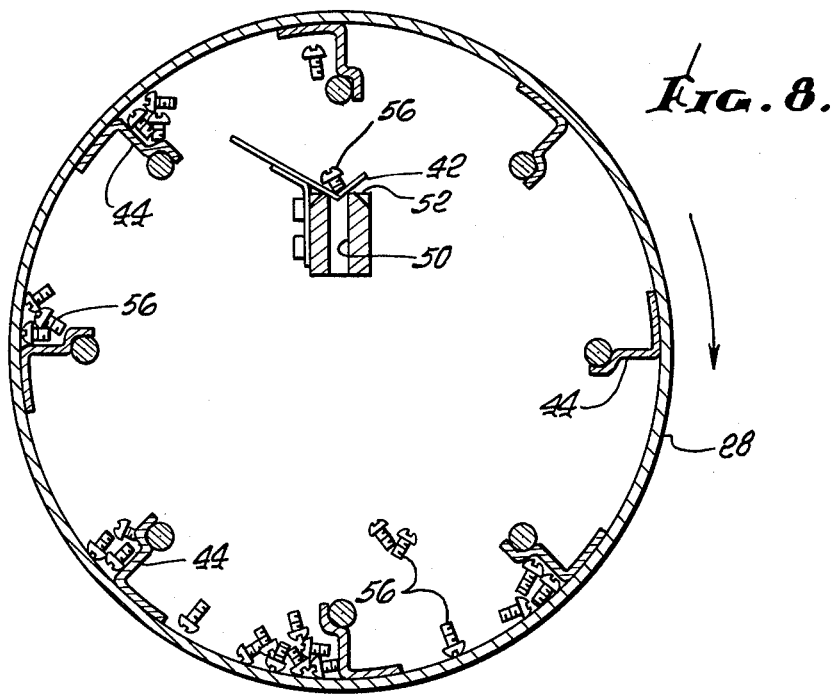
FIG. 8 is a cross-sectional view of the screw supplying bowl taken along the lines 8—8 in FIG. 1.

Referring again to the drawings, there is shown in FIGS. 1 and 2 a pneumatic automatic screwfeeder, generally designated as assembly 10. The device 10 is supported on a frame 12 on which is mounted a compressed air supply manifold 14. Supported on the manifold is an electric motor 16, having a driving shaft 18 which is driven at a low speed through substantial reduction gearing in the motor.

Adjacent its end, the shaft 18 has a pulley 20 mounted to drive a belt 22 which in turn drives a pulley 24 supported on a shaft 26 connected to rotate a screw supplying bowl 28, which is rotated at about 5 R.P.M.

Extending in the screw supplying bowl is a screw carrying ramp, generally designated as 30, supported on a mounting plate 32, secured to the frame 12. The ramp is slanted upwardly about 12°. One end 40 of the ramp extends into the bowl and upwardly extending therefrom is a screw catcher 42, as best seen in FIG. 8. The catcher is mounted on the ramp and is formed of approximately L-shape with a short leg on one side and a long leg on the other, the long leg being adpated to receive screws as they are dropped from circumferentially spaced vanes 44, secured to the inner cylindrical wall of the bowl.

As shown in FIG. 8, the bowl rotates in the clockwise direction and the screws drop off the vanes into the catcher 42, some falling into an elongated slot 50 which extends substantially for the full length of the ramp, the slot being an opening formed in the upper face of the ramp, extending vertically downwardly so that the screw bodies extend into it and the screw heads ride on the upper face 52 of the ramp. Those screws which do not go into the slot fall to the bottom of the bowl to be brought back up by the next vane contacted. The slot 50 extends downwardly coextensively with the ramp so as to provide for different lengths of screws. Similarly, the entire apparatus may be adjusted or easily changed to accommodate different size screws.

As shown in FIG. 2, the screws 56 move into the slot 50 from the catcher 42 and move on down the ramp partially by gravity but mainly by the action of a vibrator 58 mounted on the plate 32 and connected to transmit vibrations to the ramp by means of a support 60. For those situations where screws do not line up properly in the slot, a compressed air line 62 is secured to the ramp to blow such screws therefrom. A tray 64 is secured to the ramp outwardly of the bowl and extends into the bowl to return any screws that fall from the ramp to the bowl.

As shown in FIGS. 1-6, a cover 68, secured to the side of the ramp, extends over the screws adjacent the outer end of the ramp to prevent the screws from being lifted excessively by air from a compressed air line 70.

As best seen in FIG. 4, the slot 50 terminates outwardly in a generally vertically extending cylindrical metering valve feed opening 72, through which the screws are discharged from the slot and the ramp. At the outer end of the ramp a lever 76 is pivotally mounted on the ramp by means of an Allen screw 78. Extending from the lever on one side of the ramp and spaced therefrom is an arm 80, and, similarly, on the other side of the ramp, extends an arm 82. The arms are adjustably spaced from the ramp by means of screws 84. As shown in FIGS. 4 and 5, adjustably positioned in the arm 80 is a first or outer detent 86 extending through an opening 88 in the ramp and across the slot 50. Similarly, a second or inner detent 90 is adjustably secured to the arm 80, extending through opening 92 in the ramp and is adapted to be moved into the slot. Both detents have conical inner ends and are inclined upwardly to extend closely under the screw heads but to function with respect to the screw shanks or bodies. They are spaced apart along the track so as to permit the body of one screw, as 96, to fit into the space. The adjustable features, described above, provide for easy adaptation for various sizes and shapes of screws.

The detect 86 is withdrawn from the slot and the detent 90 is moved into the slot by the force of spring 98 connected at one end to the lever by a screw 100 and connected at its other end by a screw 102 to the mounting plate 32. When the detent 86 is removed from the slot, compressed air from the airline 70 moves the single screw 96 out of the slot and into the opening 72 while the detent 90 in the slot holds the screw, as 104, within the slot. Thus, the action of the spring 98 permits the screw 96 to be in position for discharge from the slot.

Shown in abutment with the end of the lever in FIG. 4 is a plunger 110 connected by rod 112 to a piston 114 within a closed cylinder 116, mounted on the plate 118 connected to the plate 32. A spring 120 within the cylinder, stronger than the spring 98, forces the plunger against the lever so as to normally hold the detent 86 across the slot. Compressed air is supplied to the cylinder by a line 122 to release the plunger against the force of the spring 120 so as to remove its force on the lever to permit the spring 98 to withdraw the detent 86 from the slot and move the detent 90 into the slot. When the air is supplied to the line 122, air is also supplied to the line 70 so as to discharge the single screw 96. The foregoing arrangement provides an escapement mechanism first metering device for discharging individual screws from the slot into the opening 72.

As best seen in FIGS. 1 and 3-7, a second metering device in the form of a valve chamber, generally designated as 126, is shown mounted on the plate 32 by screws 131 and spacers 133. The valve chamber 126 extends below the cylindrical opening 72 and has a cylindrical passage 128 therethrough adapted to receive the screws from the opening 72. The valve chamber is in the form of an elongated block comprised of two fitted parts, 130 and 132. The block part 130 extends for the full length of the chamber and the latch plate part 132 has a lower bevelled surface 136 which fits on a bevelled surface 138 on the part 130. The block parts also fit together along vertical surfaces 140 and 142, which extend on both sides of the passage 128. For the length of the part 132 half of the passage extends therein.

The plate 132 is a valve clearing latch secured to the part 130 by means of a pin 150, having a handle 152 fixed thereto in abutment with the face of plate 132. The pin 150 is threaded at 156 so as to be fixed to the latch and is slidable within the part 130. A spring 158 surrounds the outer part of the pin and on its inner end abuts a shoulder 160 of a recess 162, and the outer end of the spring is in abutment with a T-forming member 166 on the end of the pin. To aid in properly aligning the latch on the part 130, a screw 170 is threadedly engaged within the latch and slidably extends into a bore 172 in the part 130. The latch is for the purpose of removing any jammed fasteners from the passage 128, the jamming typically being caused by flashing or out-of-round parts of screws. The latch is removed by pulling the handle against the force of the spring 150 outwardly so that the face 136 of the latch moves off the face 138, at which time the latch may be rotated to expose the remaining half of the passage 128. On returning the latch to its closing position, the screw 170 serves to guide the latch back into position by its entry into the bore 172.

As best seen in FIG. 6, a valve 180 is extendible through a bore 182 to transversely close the passage 128. The valve 180 is connected to an enlarged diameter portion 184, slidable in an opening 186 in the mounting plate 32. Screwed into the portion 184 is a piston rod 188 extending into a closed cylinder 190, a piston 192 being at the end of the rod. The cylinder is secured to plate 118. Spaced between the left end of the cylinder and the piston is a spring 194 which holds the valve in a normally open position.

An air line 196 is connected to the cylinder to the right of the piston 192, and is adapted to supply air to move the piston to the left and to close the valve 180. This occurs when air is also supplied to the lines 70 and 122 to move the plunger 110 away from the lever so as to permit the spring 98 to move the detent 96 out of the slot to permit a single screw 96 to be blown out of the ramp by air from the air line 70. The screw falls through the opening 72 against the closed valve 180 adjacent the bottom of the passage 128, the screw being held on the valve until the air is shut off and the valve is opened by the spring 194.

Secured within the bottom of the valve block member 130 in alignment with the passage 128 and under the valve is a sleeve 200 having a central passage 202 to provide a continuation of the passage 128. Extending downwardly from the sleeve 200 is a screw feed tube 204 connected at its other end to a chuck 206, as shown in FIG. 2, of an air driven screwdriver 208. Feed tube air line 212 is connected to the sleeve 200 just below the valve. When the air is shut off to the valve 180, it is opened by means of its spring and a screw resting thereon drops into the feed tube by gravity and comes to rest. When the air is again turned on to the valve, air is supplied to the line 212 to drive the screw into the chuck 206 on the screwdriver. The closing of the valve prevents the air from going upwardly into the chamber 128 which is about to receive another screw after the air supplied to the cylinder 116 removes the plunger from the lever and the air in the line 70 drives the single screw 96 into the opening 72.

Figure 9:
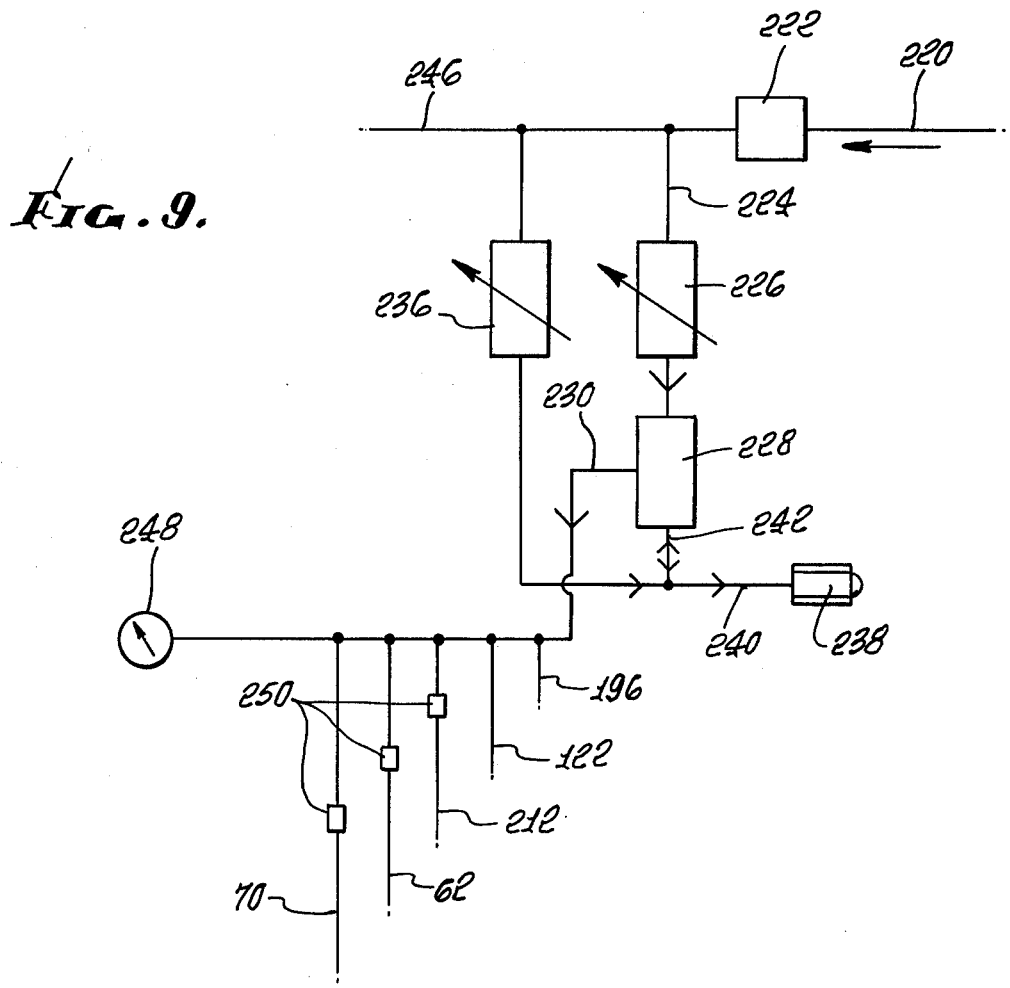
FIG. 9 is a schematic view of the pneumatic system.

In FIG. 9 an air system in and connected to the manifold 14 is shown schematically. An 80 P.S.I. air supply line 220 is connected to a main supply valve 222. Connected to the valve 222 by line 224 is a regulator 226 which reduces the air pressure to 60 P.S.I. Air from the regulator is connected to a bleed actuated air valve 228, of the type which is known in the trade as a hair trigger, light touch pilot valve. The valve 228 is normally open to permit flow into a line 230 which is a supply line for the manifold 14 and supplies air simultaneously to air lines 62, 70, 122, 196 and 212.

Also connected to the main supply is a regulator 236 which reduces the line pressure from 80 P.S.I. to 20 or 30 P.S.I. The regulator 236 is connected to the bleed-off end of the valve 228 by line 242 and to a normally closed pilot valve 238 on the screwdriver by air line 240. When the valve 238 is opened, which normally occurs just before the completion of a screwdriving operation, air is permitted to bleed out of the valve 228 causing it to close, shutting off the air to the line 230 so the conditions in FIGS. 4 and 6 exist. At all other times, during operation, air to the lines 62, 70, 122, 196 and 212 is on.

Also connected to the main air line supply is a line 246 which supplies air to drive the screwdriver 208. A gauge 248 is connected to show the manifold pressure. Lines 62, 70, and 212 are provided with restrictors 250 to reduce the pressure to about 5 to 10 P.S.I.

In operation, starting with no screws in the system, the slot 50 is filled with screws by the rotation bowl 28. As the screws enter the slot they are moved downwardly by the action of the vibrator in the ramp, aided by the slant. After the air is turned on, to move a screw into the chuck, the valve 228 is opened twice and closed twice by moving the chuck 206 inwardly, allowing it to return each time to its normal position. The screwdriver is then ready to drive the first screw. Referring to FIG. 4, at this time, the air in line 230 being on, the piston 114 has been moved to the right and the plunger is away from the lever 76; the spring 98 has pivoted the lever so as to have moved the detent 86 out of the slot and the detent 90 into the slot. A screw 96 has been blown by air from the line 70 through the metering valve feed opening 72 onto the closed valve 180.

Then as the screw is being driven, the chuck is moved inwardly so that just before the screwing operation is completed it opens the valve 238, causing the valve 228 to close to shut off the air to line 230. This permits the valve 180 to be opened by the spring 194 so that the screw thereon drops to rest in the feed tube 204 and the arrangement in FIG. 4 exists. When the chuck 206 is released to return to its outer position the valve 238 is closed, and the valve 228 again opens permitting flow through the line 230. This causes air in the line 212 to drive the screw in the feed tube to be fed into the chuck. At the same time another screw is moved out of the slot and dropped on to the then closed valve 180. The next screw is ready for insertion into the workpiece. Thereafter, the operation is continuous, the cycle being started each time by the completion of insertion of the screw causing the chuck to have opened the pilot valve 238.

Air is also provided to line 62, as shown in FIGS. 1 and 2, to remove any improperly positioned screws from the ramp. The system may be arranged to have air flowing continuously through lines 62 and 70, or may be arranged, as shown, to have the air supplied to those lines only when the pilot valve 238 on the screwdriver is closed.

The invention and its attendant advantages will be understood from the foregoing description and it will be apparent that various changes may be made in the form, construction and arrangements of the parts of the invention without departing from the spirit and scope thereof or sacrificing its material advantages, the arrangements hereinbefore described being merely by way of example. We do not wish to be restricted to the specific forms shown or uses mentioned except as defined in the accompanying claims, wherein various portions have been separated for clarity of reading and not for emphasis.

We claim:

1. In an automatic screwfeeder,
   screw carrying means having screw receiving means adjacent one end and having a screw discharge end adjacent its other end,
   screw supplying means adjacent said carrying means for supplying screws to screw receiving means,
   means associated with said carrying means to move said screws in said carrying means toward said discharge end for positioning for discharge,
   first screw metering means associated with said carrying means at the discharge end to withhold and alternately discharge single screws from the carrying means at the discharge end,
   the improvement comprising:
   second screw metering means adjacent first metering means, said second metering means being associated with said carrying means and having means to receive and releasably hold a single discharge screw from said carrying means,
   a feed tube connected at one end to said second metering means and connected at its other end to a screwdriver to supply screws thereto,
   said means to releasably hold said single screw in said second metering means having actuating means to release said single screw to said feed tube to rest therein when said first metering means is withholding another single screw, and
   means connected to said feed tube to move said single screw resting therein to said screwdriver when said first metering means discharges another single screw to said second metering means.

2. The invention according to claim 1 in which:

said carrying means is a ramp having a downwardly extending upper surface, a slot in said ramp extending downwardly from said upper surface, said slot being for receiving a row of screws therein and having their heads resting on said upper surface, and a downwardly directed discharge opening at the discharge end of the slot, said slot terminating in said opening, said discharge opening being connected to said second metering means for the passage of screws from the carrying means to the second metering means.

3. The invention according to claim 2 in which:

said first metering means includes a pair of oppositely directed detents extending through said ramp from opposite sides thereof and alternately into said slot in way of said screws adjacent said discharge end, one detent being spaced from and adjacent said opening, said other detent being spaced from said one detent away from said opening along said slot, the length of the space being sufficient for one screw, means connected to said detents to alternately insert one of the detents into the slot and remove the other from the slot, whereby when said one detent is in the slot a first screw is adjacent thereto and when said other detent is moved into said slot, said first screw is free to be discharged into said discharge opening and into said second metering means, said other detent preventing an adjacent screw from being discharged, and first pneumatic means adjacent said carrying means to supply air to discharge said first screw, when free, into said discharge opening and second metering means.

4. The invention according to claim 3 in which:

a cover extends above slot and discharge opening closely spaced above the screws to prevent said air from lifting said screws a significant distance.

5. The invention according to claim 3 in which said means connected to said detents includes:

a lever pivotally mounted on said ramp adjacent said discharge end outwardly of said discharge opening, a pair of arms connected to said lever, one arm extending on one side of said ramp, spaced therefrom and connected to said one detent and the other arm extending on the other side of said ramp, spaced therefrom and connected to said other detent.

6. The invention according to claim 5 in which said means connected to said detents further includes:

a first spring having one end connected to said lever and having its other end connected to a fixed member.

said first spring positioned to pivot the lever, when free, to move said other detent to extend into said slot and said one detent out of said slot, a second spring and a plunger normally biased by the second spring to abut the lever over the force of the first spring to hold said one detent in the slot and the other detent out of the slot, said plunger being connected to a piston within a closed cylinder supported by a fixed member, the second spring being within the cylinder in abutment with the piston to bias the plunger to abut the lever, and second pneumatic means connected to said cylinder to provide air to move the piston and plunger away and free from the lever, at which time said first spring pivots the free lever to move said one detent out of the slot and said other detent into the slot and said first screw is free to be discharged from said carrying means and into said second metering means by air from said first pneumatic means.

7. The invention according to claim 6 including:

air supply means to said second pneumatic means, to said means to releasably hold a single screw in said second metering means, and to said feed tube, and means connected to said air supply means to automatically supply air thereto and shut off air therefrom, whereby when air is supplied to said second pneumatic means, to said means to releasably hold a single screw, and to said feed tube, said one detent is moved out of said slot, said means to releasably hold holds said single screw and said screw released from said second metering means is driven to said screwdriver.

8. The invention according to claim 6 in which said second screw metering means includes:

a fixedly supported valve chamber having a generally cylindrical passage extending downwardly of said carrying means below said discharge end for receiving screws therefrom, said feed tube being connected to said passage thereunder, said means to releasably hold a single screw being a valve to close said passage between said carrying means and said feed tube, said actuating means to release said single screw being a valve spring biasing said valve into an open position to release a single screw to said tube, and valve pneumatic means connected to the valve to close said valve to retain a screw in said passage when said single screw is dischargeable from said carrying means, said valve pneumatic means being deactivated when a single screw is not dischargeable from said carrying means and to permit said valve spring to open said valve.

9. The invention according to claim 8 in which:

said valve chamber has a face plate, biased by plate spring to normally enclose said passage above said valve, said face plate being hand openable against the force of said plate spring so that said passage can be cleared of any blocking material.

10. The invention according to claim 9 in which:

said means connected to said feed tube to move said screw is an air line connected closely below said valve to supply air to drive said screw to said screwdriver when said valve pneumatic means is activated to close said valve.

11. The invention according to claim 11 in which said second screw metering means includes:

a fixedly supported valve chamber having a passage extending downwardly of said carrying means below said discharge end for receiving screws therefrom, said feed tube being connected to said passage thereunder, said means to releasably hold a single screw being a valve to close said passage between said carrying means and said feed tube, said actuating means to release said single screw being a valve spring biasing said valve into an open position to release a single screw to said tube.

12. The invention according to claim 11 in which said second metering means further includes:
   valve pneumatic means being connected to the valve to close the valve to retain a screw in said passage when said single screw is discharged from said carrying means,
   said valve pneumatic means being deactivated when a single screw is not dischargeable from said carrying means and to permit said valve spring to open said valve.

13. The invention according to claim 12 in which:
   said valve chamber has a face plate, biased by a plate spring to normally enclose said passage above said valve,
   said face plate being hand openable against the force of said plate spring so that said passage can be cleared of any blocking material.

14. The invention according to claim 13 in which:
   said means connected to said feed tube to move said screw is an air line connected closely below said valve to supply air to drive said screw to said screwdriver when said valve pneumatic means is activated to close said valve.

15. The invention according to claim 13 in which:
   said plate spring extends outwardly of a part of said chamber on the side opposite said face plate and is fitted around a pin extending from outwardly of said opposite part and side through said face plate,
   the pin being fixed in the face plate and slidable within the plate spring and the opposite part and side of the chamber,
   a T-bar member on the pin outwardly of the opposite side and against which an outer end of the plate spring abuts, the inner end of the plate spring abutting adjacent the opposite side of the chamber,
   a handle on said pin adjacent said face plate for pulling against the plate spring to remove the face plate to open the chamber, and
   a guide member fixed in said face plate and slidable in a complementary opening in said opposite part of said chamber.

16. In an automatic fastener feeder,
   fastener carrying means having fastener receiving means adjacent one end and having a fastener discharging end adjacent its other end,
   fastener supplying means adjacent said carrying means for supplying fasteners to said fastener receiving means,
   means associated with said carrying means to move said fasteners toward said discharging end for positioning for discharge,
   first fastener metering means associated with said carrying means at the discharge end to withhold and alternately discharge single fasteners from the carrying means at the discharge end,
   the improvement comprising:
   second fastener metering means adjacent said first metering means, said second metering means being associated with said carrying means and having means to receive and releasably hold a single discharged fastener,
   a feed tube connected at one end to said second metering means and connected at its other end to a fastener tool to supply fasteners thereto,
   said means to releasably hold said single fastener in said second metering means having actuating means to release said single fastener to said feed tube to rest therein when said first metering means is withholding another single fastener, and
   means connected to said feed tube to move said single fastener therein to said tool when said first metering means discharges another single fastener to said second metering means.

* * * * *